July 28, 1931. W. N. BOOTH 1,816,173
LUBRICANT PROTECTING STRUCTURE FOR INTERNAL BRAKES OF VEHICLE WHEELS
Filed March 21, 1927 2 Sheets-Sheet 2
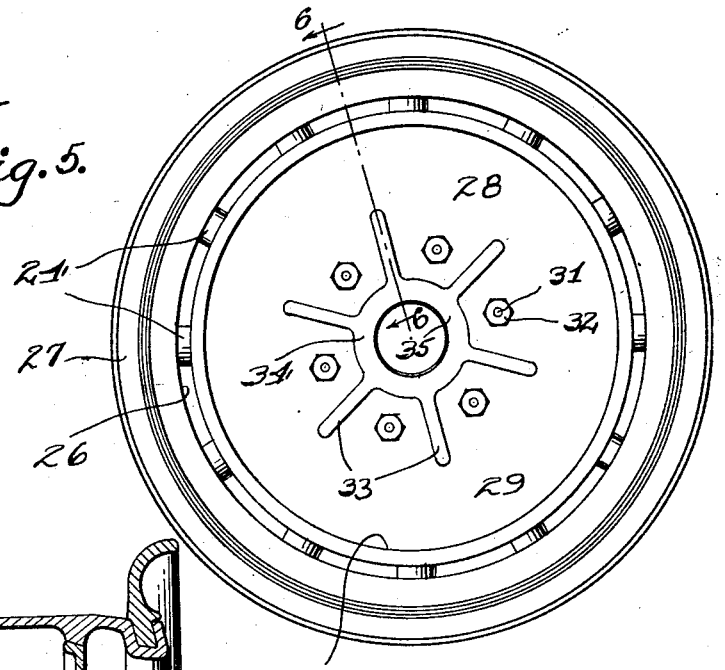
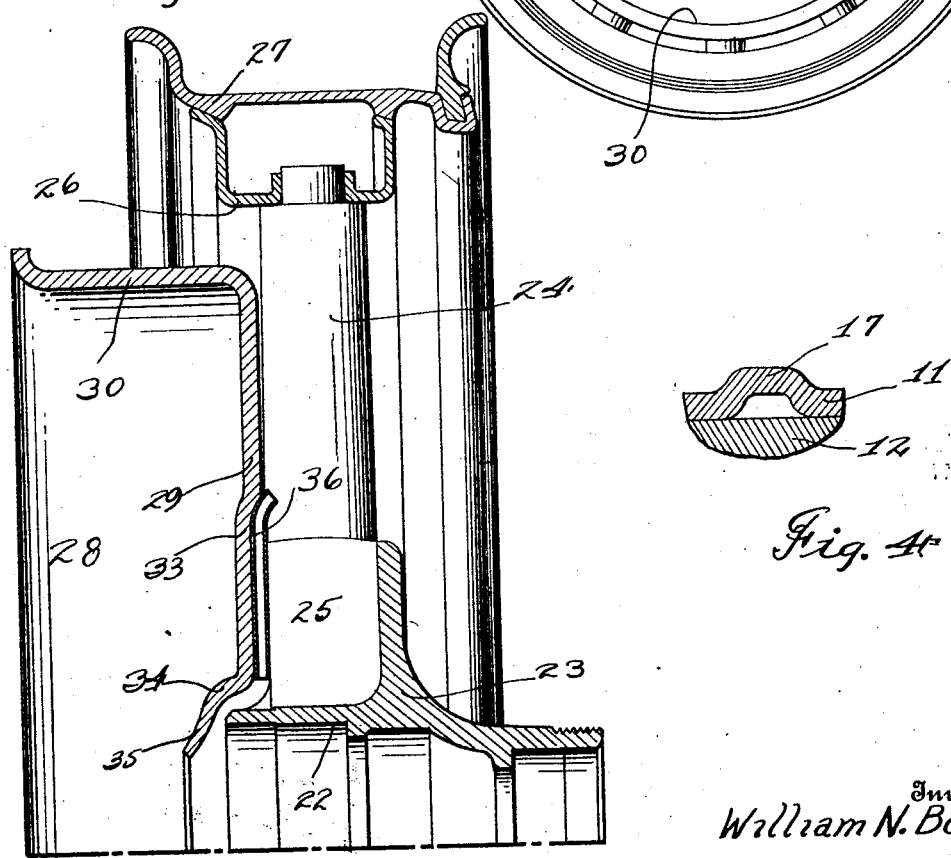
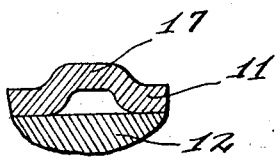
Inventor
William N. Booth Patented July 28, 1931

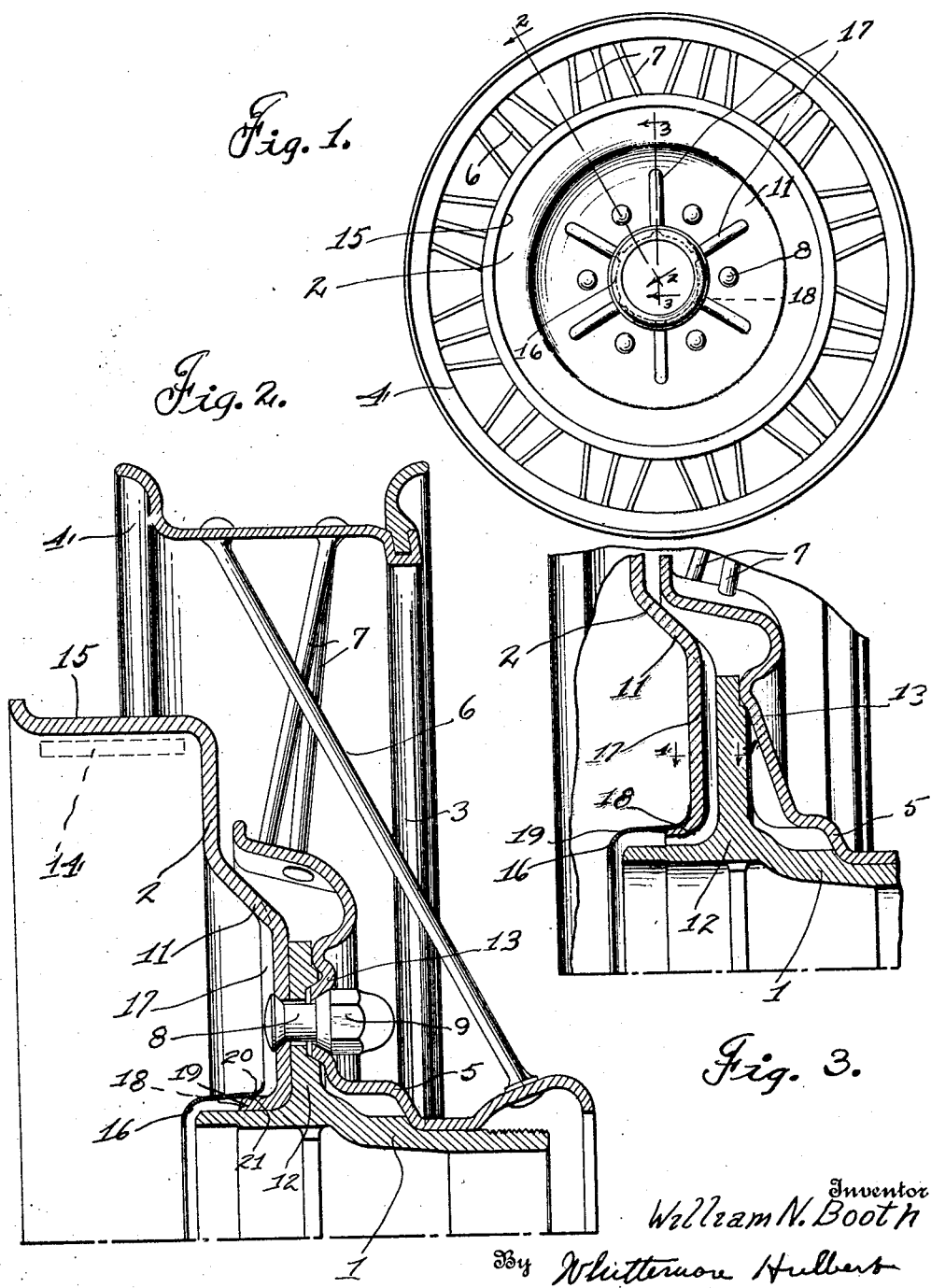

1,816,173

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

LUBRICANT PROTECTING STRUCTURE FOR INTERNAL BRAKES OF VEHICLE WHEELS

Application filed March 21, 1927. Serial No. 177,148.

The invention relates to vehicle wheels particularly of that type having brake drums for use with internal brakes. One of the objects of the invention is to provide an improved construction for protecting the internal brake and the brake flange from lubricant which might be discharged from the wheel hub or the axle housing. Another object is to so form the construction that the brake drum is reinforced. Further objects of the invention reside in the novel features of construction and combinations and arrangements of parts as more fully hereinafter set forth.

In the drawings:

Figure 1 is a rear elevation of a vehicle wheel embodying my invention;

Figures 2 and 3 are cross sections respectively on the lines 2—2 and 3—3 of Figure 1;

Figure 4 is a cross section on the line 4—4 of Figure 3;

Figure 5 is a rear elevation of a modified vehicle wheel;

Figure 6 is a cross section on the line 6—6 of Figure 5.

As shown in Figures 1, 2, 3 and 4, the wheel has the hub 1 upon which is mounted the brake drum 2 and the wheel body 3. The latter comprises the tire carrying rim 4, the hub shell 5 and the front and rear sets of spokes 6 and 7, respectively. For securing the brake drum of the hub shell to the hub I have provided the bolts 8 and the nuts 9, the bolts extending through the web 11 of the brake drum, the radial fixed flange 12 of the hub and the radial flange 13 of the hub shell.

For protecting the internal brake 14 and the brake flange 15 from lubricant which might be discharged from the rear end of the hub 1, I have provided the lubricant collecting ring 16 within the brake drum and surrounding the rear end of the wheel hub. I have also provided outwardly extending or radially hollow ribs 17 in that portion of the web 11 adjacent the fixed flange 12 and forming grooves in the front face of the web which are closed by the fixed flange. I have further provided grooves 18 in the inner face of the annular flange 19 formed at the inner edge of the brake drum web and resting upon the barrel of the wheel hub. The grooves 18 register with the grooves formed by the hollow ribs 17. The ring 16 is firmly secured to the annular flange 19 as by being telescoped thereover and formed with bosses 20 for engaging corresponding depressions 21 formed in the annular flange. The rear end of the ring extends rearwardly beyond the rear end of the hub and terminates in a rearwardly and inwardly inclined flange.

The arrangement is such that any lubricant discharged from the hub or from a point adjacent the rear end of the hub is intercepted by the oil collecting ring 16 and passes outside the brake drum through the grooves formed between the web of the brake drum and the wheel hub, centrifugal force resulting from rotation of the wheel facilitating the removal of the lubricant. Furthermore, by reason of the hollow ribs which are preferably formed by pressing the brake drum is reinforced.

In the modified construction shown in Figures 5 and 6, 22 is the wheel hub having the radial fixed flange 23. 24 are the wooden spokes having their inner beveled ends forming the hub section 25. 26 is the rim at the outer ends of the spokes, this rim being in the form of a felly for carrying the demountable tire carrying rim 27. 28 is the brake drum having the web 29 and the brake flange 30, the latter being adapted for use with an internal brake. 31 are bolts and 32 nuts for securing the brake drum and the spokes to the hub, the bolts extending through the web 29, the hub section 25 and the fixed flange 23.

In this construction the portion of the brake drum web lying adjacent to the hub section 25 is also provided with the outwardly extending or radial hollow ribs 33 which are formed by pressing and which form grooves in the front face of the web. The inner edge of the web has the annular flange 34 which is also provided with peripherally spaced hollow ribs extending parallel to the axis of the wheel and forming grooves communicating with the grooves formed by the hollow ribs 33. The inner edge of the brake drum web terminates in the annular flange 35 which extends rearwardly and inwardly beyond the rear end of the wheel hub. For protecting the wood from the lubricant, I have provided the hollow metallic tubes 36 within the passages formed between the hub section 25 and the adjacent portion of the brake drum web 29.

What I claim as my invention is:

1. In a vehicle wheel, the combination with a hub and hub flange, of a brake drum secured to said hub flange and formed with a passage extending outwardly toward the outer periphery of the wheel, and means upon said brake drum for collecting lubricant discharged from said hub and conducting the lubricant to the passage.

2. In a vehicle wheel, the combination with a hub and hub flange, of a brake drum provided with a passage extending outwardly toward the periphery of the wheel, means for securing said brake drum to said hub flange, and means upon said brake drum independent of said brake drum securing means for collecting lubricant discharged from said hub and conducting the lubricant to the passage.

3. In a vehicle wheel, the combination with a hub and hub flange, of a brake drum secured against said hub flange and provided with an outwardly extending groove in its front face closed by said hub flange, lubricant collecting means extending within said brake drum and beyond the rear end of said hub, and means for conducting the lubricant to the groove.

4. In a vehicle wheel, the combination with a hub and hub flange, of a brake drum provided with an outwardly extending groove, means for securing said brake drum to said hub flange, and means communicating with the groove and secured to said brake drum independently of said brake drum securing means and extending beyond the rear end of said hub for collecting lubricant discharged from a point adjacent the rear end of said hub.

5. In a vehicle wheel, the combination with a hub having a fixed flange, of a brake drum secured to said flange and having a hollow reinforcing rib forming therewith a passage, and means within and mounted upon said brake drum and extending beyond the rear end of said hub for collecting lubricant discharged from a point adjacent the rear end of said hub.

6. In a vehicle wheel, the combination with a hub having a barrel and a radial fixed flange, of a brake drum having a web secured to said fixed flange and an annular flange engaging said barrel, said web having an outwardly extending groove formed in its front face and extending beyond said fixed flange, and said annular flange having a groove formed in its inner face communicating with said outwardly extending groove, and a lubricant collecting ring mounted upon said annular flange and having a portion extending beyond the rear end of said hub.

7. In a vehicle wheel, the combination with a hub and hub flange, of a brake drum secured to said hub flange, lubricant collecting means extending within said brake drum and beyond the rear end of said hub, and means for conducting the lubricant collected by said means to a point outside said brake drum, including a hollow reinforcing rib for said brake drum.

8. In a vehicle wheel, the combination with a hub and hub flange, of a brake drum secured against said hub flange and provided with a groove cooperating with the hub flange to form a passage, and means for conducting the lubricant discharge from said hub to said passage.

9. In a vehicle wheel, the combination with a hub, of a brake drum mounted upon said hub having a series of radially outwardly extending grooves formed in one face thereof, a hub flange upon said hub engaging said face and cooperating with said grooves to form passages, and lubricant collecting means for conducting the lubricant to said passages.

10. In a vehicle wheel, the combination with a hub of a brake drum mounted upon said hub having a series of hollow reinforcing ribs formed in one face thereof, a hub flange upon said hub bearing against said face and cooperating with the hollow reinforcing ribs to form passages, and lubricant collecting means carried by said brake drum for conducting the lubricant to said passages.

11. In a vehicle wheel, the combination with a hub and hub flange, of a brake drum having a web terminating in an annular flange, said web and annular flange having aligned recesses therein cooperating with the hub and hub flange to form a lubricant passage, and means for conducting lubricant from the hub to said passage.

12. A vehicle wheel having a hub, a brake drum secured to said hub and provided with a brake flange and a web, said web having a central opening for sleeving over said hub, and means upon said brake drum for collecting lubricant discharged from said hub and directing the lubricant through the central opening in said web.

13. A vehicle wheel having a hub, a brake drum secured to said hub and provided with a brake flange and a web, said web having a central opening for sleeving over said hub, and an annular member engaging said brake drum for collecting lubricant discharged from said hub and directing the lubricant through the central opening in said web.

14. In a vehicle wheel, the combination with a hub and a flange member extending outwardly from the hub, of a member comprising a brake drum secured against said flange member, one of said members having a groove therein cooperating with the other member to form a passage and means for conducting the lubricant discharged from said hub to said passage.

15. In a vehicle wheel, the combination with a hub and a hub flange, of a brake drum secured to said hub flange and cooperating therewith to form an outwardly extending passage, and means upon the brake drum for collecting lubricant discharged from said hub and conducting the lubricant to the passage.

16. In a vehicle wheel, the combination with a hub, of a brake drum carried by said hub and having a web formed with grooves in the front face thereof extending outwardly toward the periphery of the drum, and means within the drum and upon said web for collecting lubricant discharged from said hub and conducting the lubricant to the grooves.

In testimony whereof I affix my signature.

WILLIAM N. BOOTH.